United States Patent
Ramasamy et al.

(10) Patent No.: US 11,811,600 B2
(45) Date of Patent: Nov. 7, 2023

(54) SERVER FOR CONTROLLING NETWORK ELEMENT IN COMMUNICATION SYSTEM AND OPERATING METHOD THEREFOR

(71) Applicant: SAMSUNG ELECTRONICS CO., LTD., Suwon-si (KR)

(72) Inventors: Boopathi Ramasamy, Suwon-si (KR); Murali Mohan Murthy Potham, Suwon-si (KR); Pranay Dhondi, Suwon-si (KR); Dongchan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/754,234

(22) PCT Filed: Nov. 18, 2020

(86) PCT No.: PCT/KR2020/016296
§ 371 (c)(1),
(2) Date: Mar. 28, 2022

(87) PCT Pub. No.: WO2021/101252
PCT Pub. Date: May 27, 2021

(65) Prior Publication Data
US 2022/0376976 A1 Nov. 24, 2022

(30) Foreign Application Priority Data
Nov. 22, 2019 (KR) .................. 10-2019-0151424

(51) Int. Cl.
*G06F 15/16* (2006.01)
*H04L 41/0816* (2022.01)
(Continued)

(52) U.S. Cl.
CPC ...... *H04L 41/0816* (2013.01); *H04L 41/0661* (2023.05); *H04L 41/082* (2013.01);
(Continued)

(58) Field of Classification Search
CPC ............. H04L 41/0816; H04L 41/0672; H04L 41/082; H04L 41/0853; H04L 43/0876; H04L 43/16; H04L 41/0893
(Continued)

(56) References Cited

U.S. PATENT DOCUMENTS 8,295,215 B2   10/2012   Morrill et al.
8,805,976 B2   8/2014    Ozawa et al.
(Continued)

FOREIGN PATENT DOCUMENTS

EP   2735119 B1     5/2017
WO   2012144721 A1  10/2012

OTHER PUBLICATIONS

International Search Report and Written Opinion of the International Searching Authority in connection with International Application No. PCT/KR2020/016296 dated Feb. 22, 2021, 9 pages.

*Primary Examiner* — Karen C Tang

(57) ABSTRACT

The present disclosure relates to: a communication technique for merging IoT technology with a 5G communication system for supporting a higher data rate than a beyond 4G system; and a system therefor. The present disclosure can be applied to intelligent services (for example, smart homes, smart buildings, smart cities, smart cars or connected cars, healthcare, digital education, small businesses, security- and safety-related services, and the like) on the basis of 5G communication technology and IoT-related technology. A controller node is disclosed. The controller node comprises: a processor for generating a network element (NE) list on the basis of time zone information and threshold information
(Continued)

obtained from a database (DB) node; and a communication interface for receiving a configuration information request message from a network element corresponding to the network element list and transmitting a configuration information response message to the network element in response to the configuration information request message.

10 Claims, 10 Drawing Sheets

(51) Int. Cl.
  *H04L 41/082* (2022.01)
  *H04L 41/0853* (2022.01)
  *H04L 43/0876* (2022.01)
  *H04L 43/16* (2022.01)
  *H04L 41/0659* (2022.01)
  *G06F 15/173* (2006.01)
(52) U.S. Cl.
  CPC ...... *H04L 41/0853* (2013.01); *H04L 43/0876* (2013.01); *H04L 43/16* (2013.01)
(58) Field of Classification Search
  USPC .......................................................... 709/224
  See application file for complete search history.

(56) References Cited

U.S. PATENT DOCUMENTS

| | | | |
|---|---|---|---|
| 8,958,790 B2 | 2/2015 | Carter | |
| 9,060,309 B2 | 6/2015 | Lim | |
| 9,231,773 B2 | 1/2016 | Farthofer et al. | |
| 9,893,940 B1* | 2/2018 | Chawla | H04L 41/0893 |
| 11,063,821 B2* | 7/2021 | Cabral | H04L 41/082 |
| 11,165,648 B1* | 11/2021 | Bollineni | H04L 41/16 |
| 2008/0281947 A1* | 11/2008 | Kumar | H04L 41/0806 |
| | | | 709/220 |
| 2013/0236169 A1 | 9/2013 | Gaudette et al. | |
| 2013/0246606 A1* | 9/2013 | Branch | H04L 43/12 |
| | | | 709/224 |
| 2014/0342721 A1 | 11/2014 | Pollakowski et al. | |
| 2015/0236907 A1* | 8/2015 | Popli | H04L 43/0805 |
| | | | 709/226 |
| 2015/0365291 A1* | 12/2015 | Burton | H04L 41/0893 |
| | | | 709/226 |
| 2016/0294605 A1* | 10/2016 | Searle | H04L 41/069 |
| 2019/0121348 A1* | 4/2019 | Cella | G06N 3/084 |
| 2020/0394069 A1* | 12/2020 | Sbriccoli | H04L 67/10 |
| 2020/0404076 A1* | 12/2020 | Mahadevan | H04L 67/34 |
| 2021/0072965 A1* | 3/2021 | Masters | H04L 41/0895 |
| 2021/0111968 A1* | 4/2021 | Clarke | H04L 43/04 |
| 2022/0006726 A1* | 1/2022 | Michael | H04L 41/0806 |

\* cited by examiner

SERVER FOR CONTROLLING NETWORK ELEMENT IN COMMUNICATION SYSTEM AND OPERATING METHOD THEREFOR

CROSS-REFERENCE TO RELATED APPLICATIONS

This application is a 371 of International Application No. PCT/KR2020/016296, filed Nov. 18, 2020, which claims priority to Korean Patent Application No. 10-2019-0151424, filed Nov. 22, 2019, the disclosures of which are herein incorporated by reference in their entirety.

BACKGROUND

1. Field

The disclosure relates to a communication system, and more particularly, to a server for controlling a network element in the communication system and a method of operating the same.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shill keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data. processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

Due to the development of a communication system, the number of network elements to be managed by a server is greatly increased, and thus a service delay problem for the network elements may occur.

SUMMARY

The disclosure provides a server for performing a network element control operation for preventing a service delay for a plurality of network elements in a communication system and a method of operating the same.

According to an embodiment of the disclosure, a controller node includes a processor configured to generate a network element (NE) list based on time zone information and threshold information obtained from a database (DB) node: and a communication interface configured to receive a configuration information request message from a network element corresponding to the network element list and to transmit a configuration information response message to the network element corresponding to the configuration information request message.

The time zone information may include a list of a plurality of different time zones, a maintenance period corresponding to each of the time zones, and information on NES disposed in each of the time zones.

The information on the NEs may include the number of NEs in which reset is required among NEs disposed in each of the time zones.

The processor may determine a reset rate corresponding to each of the time zones based on the maintenance period and the number of NEs in which reset is required.

The processor may determine a reset completion rate of each of the time zones based on the information on the NEs and the maintenance period.

The reset completion rate may indicate a ratio of network elements capable of completing reset within the maintenance period among serviceable network elements disposed in each of the time zones.

The processor may determine an in-service rate based on the reset ate and the reset completion rate.

The processor may generate the network element list based on the in-service rate and the threshold information.

The network element list may indicate at least one network element that receives the reset request message.

The in-service rate may be generated in units of the maintenance period.

The processor may generate reset interval information based on the time zone information. The reset interval information may include information on a predetermined reset interval and a self-execution capacity reduction rate of the controller node. The self-executing capacity reduction rate may be generated in each reset interval.

The processor may generate the network element list based on the in-service rate, the threshold information, and the self-executing capacity reduction rate.

According to an embodiment of the disclosure, a method of operating a controller node includes generating a network element (NE) list based on time zone information and threshold information obtained from a database (DB) node; receiving a configuration information request message from a network element corresponding to the network element list; and transmitting a configuration information response message to the network element corresponding to the configuration information request message.

The time zone information may include a list of a plurality of different time zones, a maintenance period corresponding to each of the time zones, and information on NEs disposed in each of the time zones.

The information on the NEs may include the number of NEs in which reset is required among NEs disposed in each of the time zones.

Generating a network element (NE) list may include determining a reset rate corresponding to each of the time zones based on the maintenance period and the number of NEs in which reset is required.

Generating a network element (NE) list may further include determining a reset completion rate of each of the time zones based on information on the NEs and the maintenance period. The reset completion rate may indicate a ratio of network elements capable of completing reset within the maintenance period among serviceable network elements disposed in each of the time zones.

Generating a network element (NE) list may further include determining an in-service rate based on the reset rate and the reset completion rate.

Generating a network element (NE) list may further include generating the network element list based on the in-service rate and the threshold information. The network element list may indicate at least one network element that receives the reset request message. The in-service rate may be generated in units of the maintenance period.

Generating a network element (NE) list may further include generating reset internal information based on the time zone information. The reset interval information may include information on a predetermined reset interval and a self-execution capacity reduction rate of the controller node. The self-executing capacity reduction rate may be generated in each reset interval.

Generating a network element (NE) list may further include generating the network element list based on the in-service rate, the threshold information, and the self-executing capacity reduction rate.

According to he disclosure, it is possible to prevent a service delay for a plurality of network elements through a server for controlling a network element in a communication system and a method of operating the same.

According to the disclosure, in a communication system, a server can prevent a service delay in a maintenance window according to a time zone by controlling resets for a plurality of network elements based on time zone and threshold information.

According to the disclosure, in a communication system, a server can prevent a service delay in each fixed interval of a maintenance window by controlling resets for a plurality of network elements based on time zone and threshold information.

DETAILED DESCRIPTION

Figure 1:
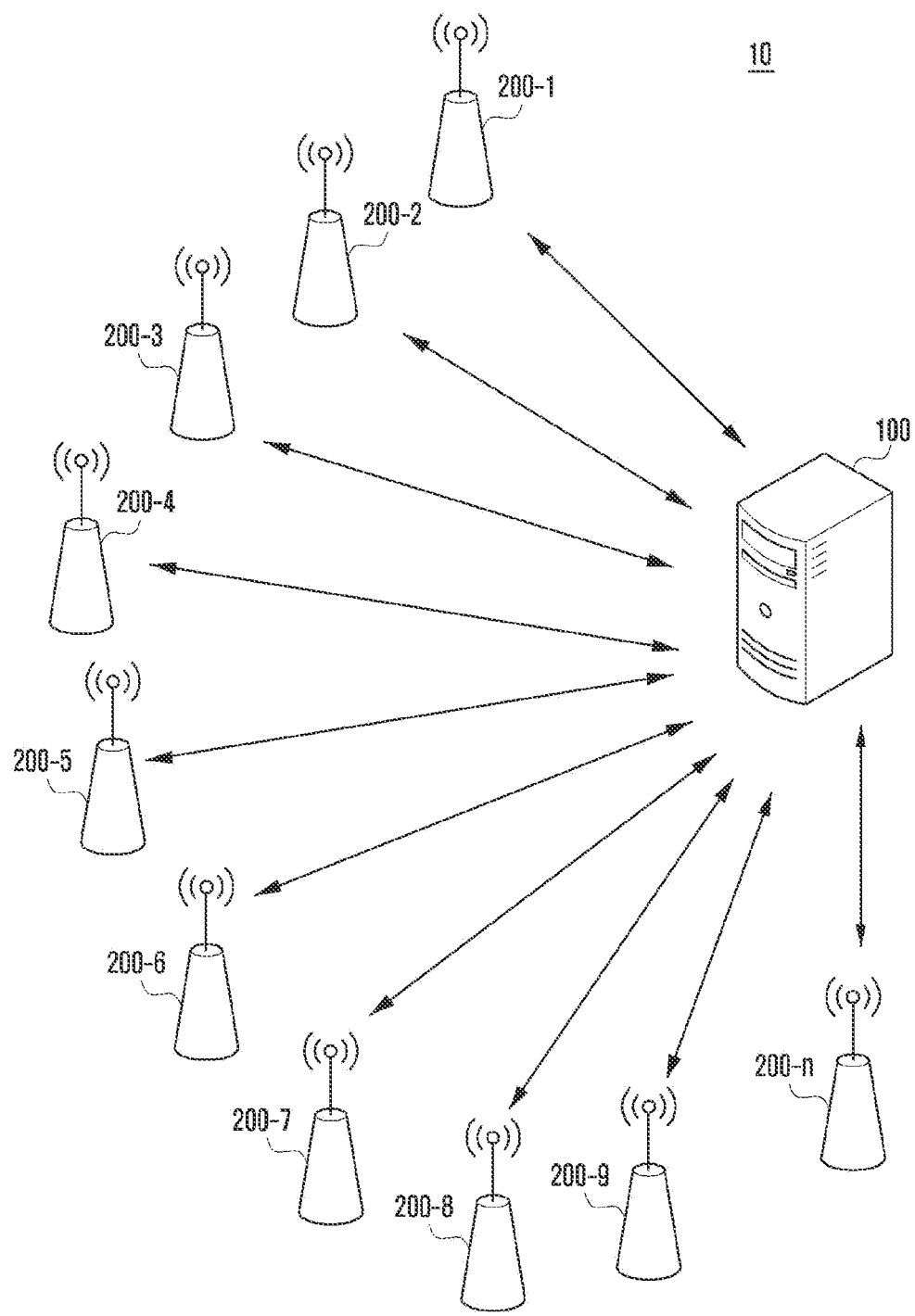
FIG. 1 is a conceptual diagram illustrating an environment of a communication system according to an embodiment of the disclosure.

FIG. 1 is a conceptual diagram illustrating an environment of a communication system according to an embodiment of the disclosure.

With reference to FIG. 1, a communication system 10 may support a 4G LTE communication system and a 5G NR communication system. The communication system 10 may include a server 100 and a plurality of network elements 200-1 to 200-n.

The server 100 may be an operations, administration and management (OAM) server. For example, the server 100 may perform network configuration, tuning, software update, and maintenance for the plurality of network elements 200-1 to 200-n.

The plurality of network elements 200-1 to 200-n may include a macro cell, a small cell, a femto cell, and a customer premises equipment (CPE).

For example, the macro cell may be a base station. The small cell and the femto cell may be an access point. The CPE may be a set top box.

The small cell, femto cell, and CPE may operate based on plug and play (PnP). Accordingly, the small cell, the femto cell, and the CPE within the communication system 10 may be rapidly deployed and expanded by an operator of the communication system 10.

The server 100 may receive each configuration request from the plurality of network elements 200-1 to 200-n. The server 100 may be required to transmit a response to configuration requests within a specific time limit determined by a protocol.

For example, the server 100 may frequently modify a network configuration due to addition of macro cells, changes in regulatory requirements such as a frequency, cell planning, and the like. A frequent modification to the network configuration may simultaneously trigger a reconfiguration for all network elements 200-1 to 200-*n* or some network elements in the communication system 10.

Accordingly, the server 100 may have to simultaneously perform a reconfiguration of all network elements 200-1 to 200-*n* or some network elements in the communication system 10 due to a frequent modification to the network configuration. In this case, the number of all network elements 200-1 to 200-*n* may be up to 1 million.

The server 100 may have to modify a network configuration within a maintenance window, which is a predetermined time period. In this case, the maintenance window may be limited and vary according to requirements.

The server 100 centralized in the communication system 10 may have to reconfigure the plurality of network elements 200-1 to 200-*n* under the following circumstances and conditions.

First, the server 100 may have to respond to a plurality of requests simultaneously triggered by the plurality of network elements 200-1 to 200-*n* within a time limit defined by a protocol. For example, the plurality of requests may be in the millions. Further, the time limit defined by the protocol may be 10 seconds.

Further, the server 100 may have to complete a reconfiguration of the plurality of network elements 200-1 to 200-*n* according to the plurality of requests within the user's maintenance window. For example, the user's maintenance window may be one hour.

For example, in the conditions and circumstances described above, the server 100 may have to respond within 3 ms to each protocol exchange event generated by the 1 million network elements 200-1 to 200-*n*. Even an enterprise-class high-end server may not be able to respond within 3 ms to each protocol exchange event generated by 1 million network elements 200-1 to 200-*n*.

Above all, in order to reset the network elements 200-1 to 200-*n*, the server 100 may have to perform an exchange operation for a plurality of protocols. Accordingly, the server 100 may require a significant processing time for resetting the network elements 200-1 to 200-*n*.

An exchange of protocols may fail. For example, an exchange of protocols may fail at a last stage due to time out. When the protocol exchange fails, the server 100 may have to restart reset of the network elements 200-1 to 200-*n* from an initial stage. When the server 100 repeats reset of the network elements 200-1 to 200-*n*, network service recovery may be delayed.

When a change to the network configuration is applied, the server 100 may apply changed configuration information required for the network elements 200-1 to 200-*n* to reset the network configuration. For example, when the server 100 triggers the reset of the network elements 200-1 to 200-*n* and the changed configuration information is applicable, the server 100 may change a configuration for the network element in which reset is required among the network elements 200-1 to 200-*n*.

The server 100 according to an embodiment of the disclosure may reconfigure the network elements 200-1 to 200-*n* based on the updated configuration information. The network elements 200-1 to 200-*n* may transmit a message requesting to update configuration information to the server 100. The server 100 may perform PnP-based reboot for the network elements 200-1 to 200-*n* based on the configuration information update request message received from the network elements 200-1 to 200-*n*. For example, the server 100 may perform a PnP reset operation for the network elements 200-1 to 200-*n* based on the configuration information request message received from the network elements 200-1 to 200-*n*.

Figure 2:
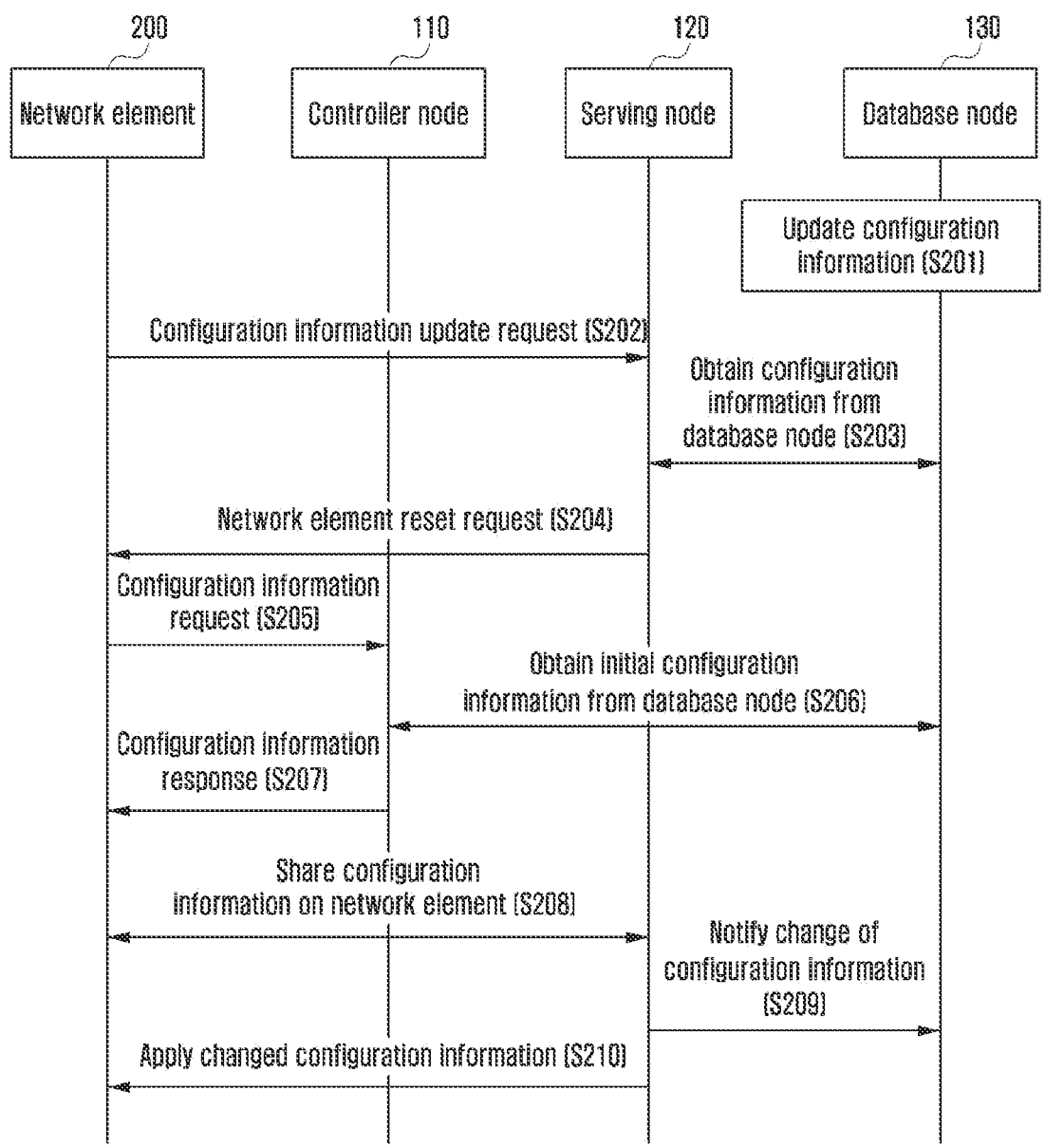
FIG. 2 is a message flow diagram illustrating a signal flow between network entities in a communication system according to an embodiment of the disclosure.

For example, the flow of operations of the network element and the server 100 for resetting the network elements 200-1 to 200-*n* may be the same as that illustrated in FIG. 2.

FIG. 2 is a message flow diagram illustrating a signal flow between network entities in a communication system according to an embodiment of the disclosure.

With reference to FIG. 2, the server 100 may include a controller node 110, a serving node 120, and a database node 130.

The database node 130 may update configuration information (S201). For example, the database node 130 may update configuration information on at least one of the network elements 200-1 to 200-*n*.

The network element 200 may transmit a configuration information update request message to the serving node 120 (S202). The serving node 120 may receive a configuration information update request message from the network element 200.

The serving node 120 may obtain at least one piece of configuration information from the database node 130 based on the configuration information update request message received from the network element 200 (S203). For example, the serving node 120 may obtain. from the database node 130, at least one piece of configuration information corresponding to the network element 200 that has transmitted the configuration information update request message. In this case, the serving node 120 may determine whether at least one piece of configuration information corresponding to the network element 200 has been changed.

When at least one piece of configuration information corresponding to the network element 200 is changed, the serving node 120 may transmit a network element reset request message to the network element 200 (S204). The network element 200 may receive a network element reset request message from the serving node 120.

The network element 200 may transmit a configuration information request message to the controller lode 110 based on the network element reset request message received from the serving node 120 (S205). The controller node 110 may receive a configuration information request message from the network element 200.

The controller node 110 may obtain at least one piece of initial configuration information from the database node 130 based on the configuration information request message received from the network element 200. For example, the controller node 110 may obtain at least one piece of initial configuration information corresponding to the network element 200 from the database node 130 based on the configuration information request message received from the network element 200.

The controller node 110 may transmit a configuration information response message to the network element 200 based on at least one piece of initial configuration information obtained from the database node 130 (S207). The network element 200 may receive a configuration information response message from the controller node 110.

The network element 200 may share current configuration information on the network element 200 with the serving node 120 based on the configuration information response message received from the controller node 110 (S208). For example, the network element 200 may transmit a message notifying that the configuration information of the network element 200 is changed to the serving node 120. The serving node 120 may receive a message notifying that the configuration information of the network element 200 is changed from the network element 200.

The serving node 120 may transmit, to the database node 130, a message notifying that the configuration information of the network element 200 received from the network element 200 is changed (S209). The database node 130 may receive a message notifying that the configuration information of the network element 200 is changed from the serving node 120. The database node 130 may update the configuration information based on a message notifying that the configuration information of the network element 200 is changed.

The serving node 120 may transmit a message instructing to apply the changed configuration information to the network element 200 (S210). The network element 200 may receive a message instructing to apply the changed configuration information from the serving node 120. The network element 200 may apply the changed configuration information based on a message instructing to apply the changed configuration information.

Figure 3:
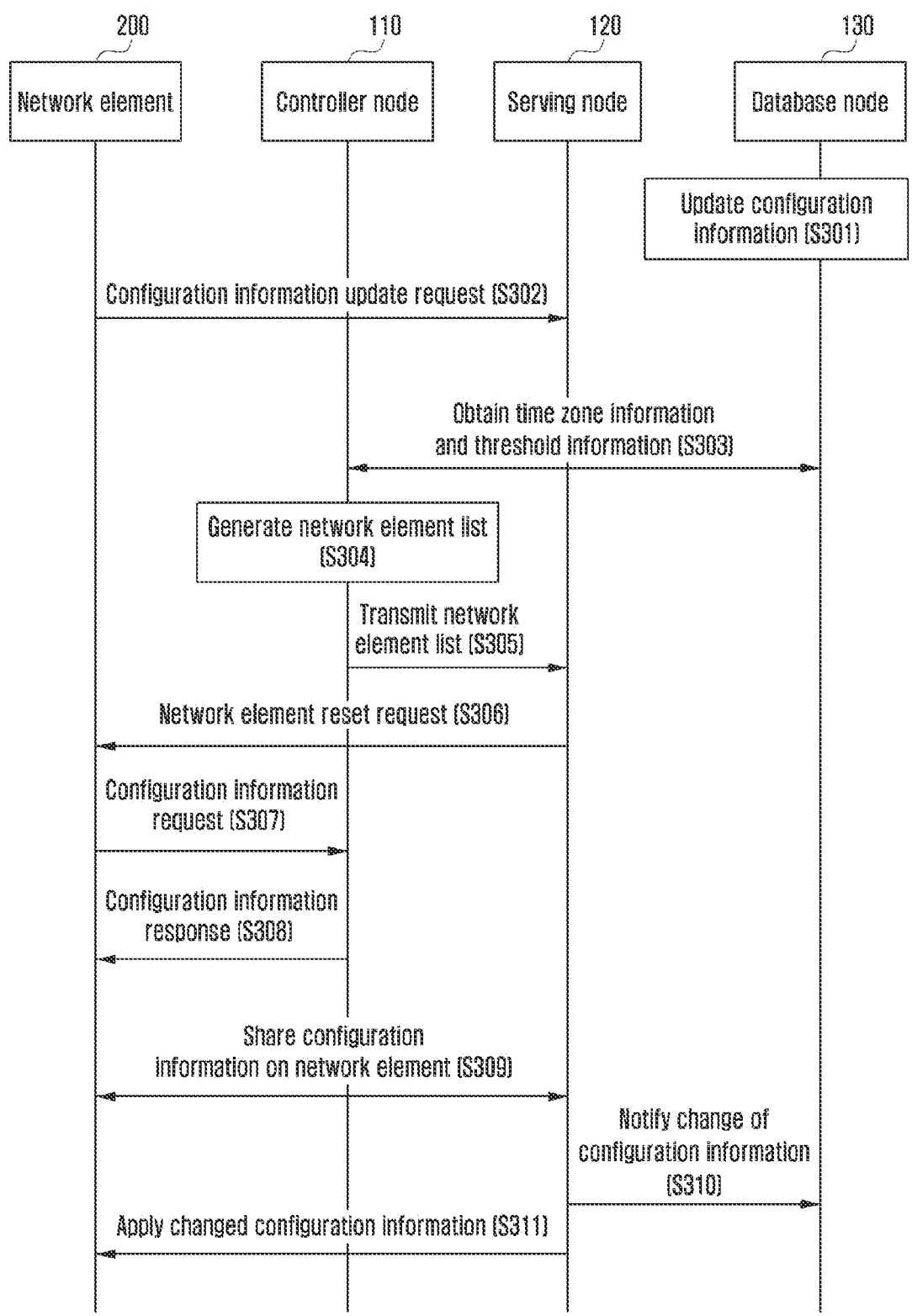
FIG. 3 is a message flow diagram illustrating a signal flow between network entities in a communication system according to an embodiment of the disclosure.

FIG. 3 is a message flow diagram illustrating a signal flow between network entities in a communication system according to an embodiment of the disclosure.

With reference to FIG. 3, the database node 130 may update configuration information (S301). For example, the database node 130 may update configuration information on at least one of the network elements 200-1 to 200-n.

The network element 200 may transmit a configuration information update request message to the serving node 120 (S302). The serving node 120 may receive a configuration information update request message from the network element 200.

The controller node 110 may obtain time zone information and threshold information from the database node 130 (S303). The database node 130 may store time zone and threshold information.

For example, the time zone information may be the same as that illustrated in Table 1.

TABLE 1

| TZ | Start time of MW | End time of MW | Area code | NE MAC address |
|---|---|---|---|---|
| ET zone (Z1) | GMT 06:00 | GMT 10:00 | 1111 | 20DBABAABBCE |
|  |  |  | 1112 | 20DBABAABVCC |
| CT zone (Z2) | GMT 07:00 | GMT 11:00 | 2111 | F4D9FB000002 |
|  |  |  | 2112 | F4D9FB000001 |
| DT zone (Z3) | GMT 08:00 | GMT 12:00 | 3111 | 30ECBCBBCCDF |
|  |  |  | 3112 | 30ECBCBBCDEG |
| PT zone (Z4) | GMT 09:00 | GMT 13:00 | 4111 | G5E0GC111113 |
|  |  |  | 4112 | G5E0GC111112 |
| ... | ... | ... | ... | ... |

With reference to Table 1, time zone information may include a start time and an end time of a maintenance window (MW) corresponding to each time zone (TZ), an a code, and a media access control (MAC) address of a network element (NE). The maintenance window may mean a time period in which the reset of the network element should be completed in order to avoid interruption of a service. The maintenance window may be referred to as a maintenance period.

The time zone may be classified according to the longitude. The time zone may be divided into a plurality of time zones. For example, the time zone may include an eastern time (ET) zone Z1, a central time (CT) zone Z2, a daylight time (DT) zone Z3, and a pacific time (PT) zone Z4.

A start time of the maintenance window of the ET zone may be Greenwich mean time (GMT) 06:00, and an end time thereof may be GMT 10:00. A start time of the maintenance window of the CT zone may be GMT 07:00, and an end time thereof may be GMT 11:00. A start time of the maintenance window of the DT zone may be GMT 08:00, and an end time thereof may be GMT 13:00. A start time of the maintenance window of the PT zone may be GMT 09:00, and an end time thereof may be GMT 13:00.

Each time zone may be divided into a plurality of areas. The plurality of areas may correspond to each area code.

For example, an area code of a first area of the ET zone may be 1111. MAC addresses of network elements disposed in the first area of the ET zone may be 20DBABAABBCE. An area code of a second area of the ET zone may be 1112. MAC addresses of network elements disposed in the second area of the ET zone may be 20DBABAABVCC.

For example, an area code of a first area of the CT zone may be 2111. MAC addresses of network elements disposed in the first area of the CT zone may be F4D9FB000002. An area code of a second area of the CT zone may be 2112. MAC addresses of network elements disposed in the second area of the ET zone may be F4D9FB000001.

For example, an area code of a first area of the DT zone may be 3111. MAC addresses of network elements disposed in the first area of the DT zone may be 30ECBCBBCCDF. An area code of a second area of the DT zone may be 3112. MAC addresses of network elements disposed in the second area of the DT zone may be 30ECBCBBCDEG.

For example, an area code of the first area of the PT zone may be 4111. MAC addresses of network elements disposed in the first area of the PT zone may be G5E0GC 111113. An area code of the second area of the PT zone may be 4112. MAC addresses of network elements disposed in the second area of the PT zone may be G5E0GC111112.

The controller node 110 may generate a network element list based on the time zone information (S304). For example, the controller node 110 may determine the N number of network elements in which a reconfiguration is required based on the time zone information. Here, the N number of network elements may provide a network service and be connected to the controller node 110. Network elements capable of providing a network service and capable of being connected to the controller node 110 may be referred to as an active network element or an in-service network element.

For example, N may be represented as in Equation 1.

$$N = N_{Z1} + N_{Z2} + N_{Z3} + \ldots + N_{Zn} \quad [\text{Equation 1}]$$

Here, NZ1 may be the number of network elements in which reset is required disposed in a time zone Z1. NZ2 may be the number of network elements in which reset is required disposed in a time zone Z2. NZ3 may be the number of network elements in which reset is required and disposed in a time zone Z3. NZn may be the number of network elements in which reset is required disposed in a time zone Zn.

The controller node 110 may determine a PnP reset rate O based on the time zone information. The PnP reset rate may mean the number of network elements that may be processed per minute (1 min) by the server 100. The PnP reset rate may be referred to as a reset rate.

The controller node 110 may determine a time period (min) of a maintenance window MW of each of the time zones. For example, the controller node 110 may determine a time period W1 of the maintenance window MWZ1 of the time zone Z1. A maintenance window MWZ1 of the time zone Z1 may be a difference between an expected start time and an expected end time of the maintenance window of the time zone Z1. For example, the maintenance window MWZ1 of the time zone Z1 may be represented as in Equation 2.

$$W_1 = MW_{Z1} = ET_{Z1} - ST_{Z1} \quad \text{[Equation 2]}$$

Here, $ET_{Z1}$ may be an expected start time of the maintenance window of the time zone Z1. STZ1 may be an expected end time of the maintenance window of the time zone Z1.

The controller node 110 may determine a reset rate RZ1 of the time zone Z1 based on the time period W of the maintenance window MWZ1 of the determined time zone Z1 and the number NZ1 of network elements in which reset is required and disposed in the time zone Z1. For example, the reset rate RZ1 of the time zone Z1 may be represented as in Equation 3.

$$R_{Z1} = N_{Z1} / W_1 \quad \text{[Equation 3]}$$

The controller node 110 may determine a network element reset completion rate K for each of the time zones. For example, the network element reset completion rate K may be determined based on a ratio of network elements in which reset is completed and serviceable network elements among network elements positioned inside a specific time zone. The network element reset completion rate K may be determined in units of 1 minute.

The controller node 110 may determine an in-service rate S based on the time period W of the maintenance window MW and the network element reset completion rate K for each of the time zones. The in-service rate may be a ratio of the number of restored network elements and the number of network elements that should receive a reset request message. Alternatively, the in-service rate may be determined based on a ratio of the network element reset completion rate K and the reset rate R of the time zone.

For example, the in-service rate S of the time zone Z1 may be represented as in Equation 4.

$$S = (K/R_{Z1}) \times 100 \quad \text{[Equation 4]}$$

Threshold information may include an outbound rate X, an inbound rate Y, and a self-execution capacity threshold rate E. Each unit of the outbound rate X, the inbound rate Y, and the self-executing capacity threshold rate E may be %.

The outbound rate X may be a threshold rate for determining whether to stop an operation for resetting the network element. For example, the controller node 110 may determine whether to stop an operation for resetting the network element based on the outbound rate X. The outbound rate X may be referred to as a first rate.

The inbound rate Y may be a threshold rate for determining whether to start operation for resetting the network element. For example, the controller node 110 may determine whether to start an operation for resetting the network element based on the inbound rate Y. The inbound rate Y may be referred to as a second rate.

The self-executing capacity threshold ratio E may be a threshold ratio for determining whether the self-executing capacity of the server 100 is degraded. For example, the controller node 110 may determine whether the self-executing capacity of the server 100 is degraded based on the self-executing capacity E. For example, when the self-executing capacity reduction rate is equal to or less than the self-executing capacity threshold ratio E, the controller node 110 may determine that the self-executing capacity of the server 100 is degraded.

Figure 4:
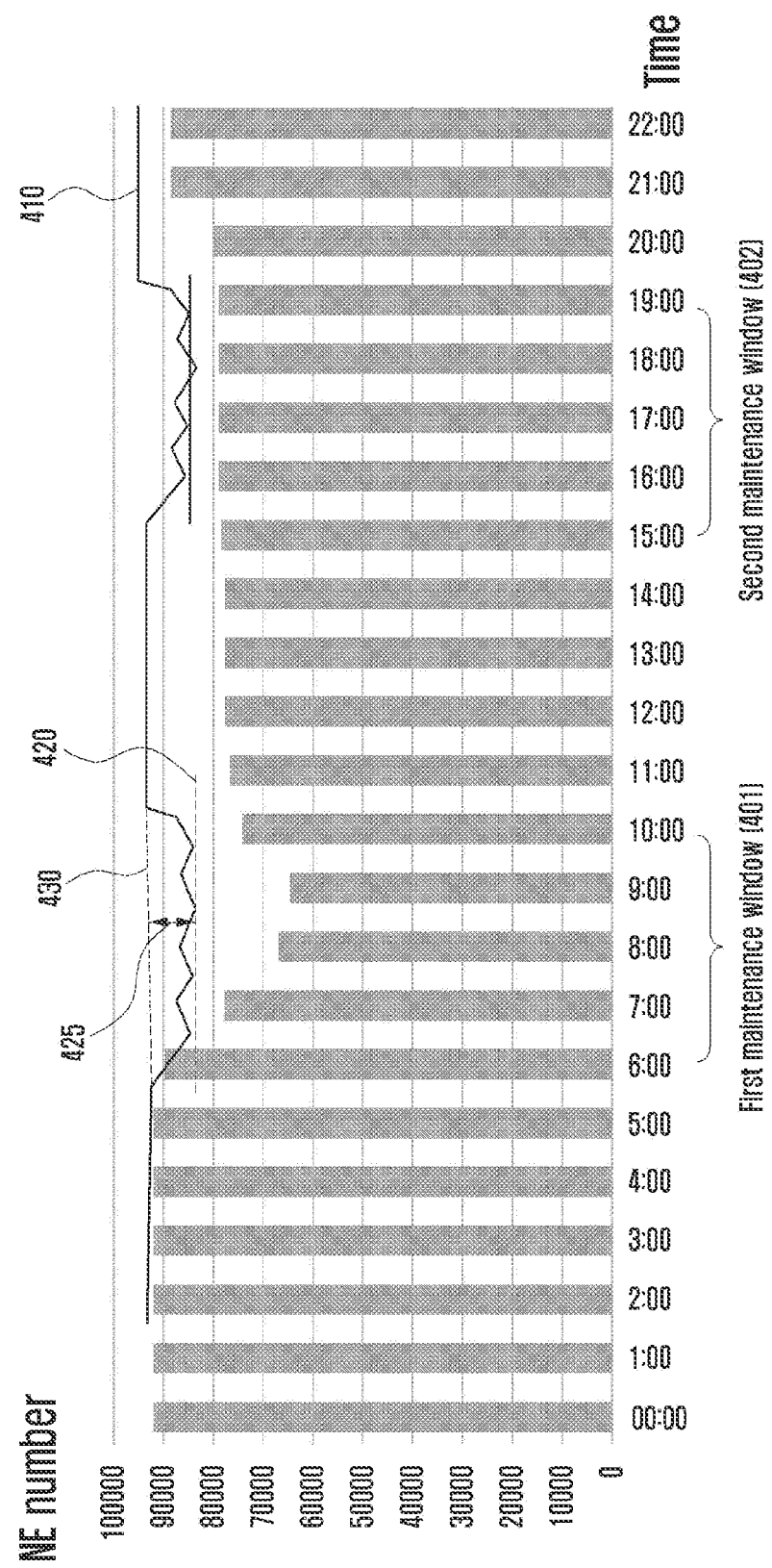
FIG. 4 is a graph illustrating an in-service rate, an outbound rate, and an inbound. rate in a communication system according to an embodiment of the disclosure.

For example, the in-service rate, the outbound rate, and the inbound rate may be displayed as illustrated in FIG. 4.

FIG. 4 is a graph illustrating an in-service rate, an outbound rate, and an inbound rate in a communication system according to an embodiment of the disclosure.

With reference to FIG. 4, an X-axis of the graph may be a time and a Y-axis thereof may be the number of network elements. The time on the X-axis may be GMT. The number of network elements of the Y-axis may be the number of network elements in which reset is completed.

The controller node 110 may determine an in-service rate 410 according to each time. For example, a first maintenance window 401 of a time zone Z1 may be 06:00 to 10:00. The controller node 110 may determine whether the in-service rate 410 is less than an outbound rate 420 in the first maintenance window 401 of the time zone Z1. When the in-service rate 410 is less than the outbound rate 420 in the first maintenance window 401 of the time zone Z1, the controller node 110 may determine to stop an operation for resetting the network elements corresponding to a time in which the in-service rate 410 is less than the outbound rate 420. Thereafter, the controller node 110 may determine whether to perform an operation for resetting the network elements whose reset is stopped in the first maintenance window 401 in a second maintenance window 402.

The controller node 110 may determine whether the in-service rate 410 exceeds an inbound rate 430 in the first maintenance window 401 of the time zone Z1. When the in-service rate 410 exceeds the inbound rate 420 in the first maintenance window 401 of the time zone Z1, the controller node 110 may determine to resume an operation for resetting the network elements corresponding to a time in which the in-service rate 410 is less than the inbound rate 430.

The controller node 110 may determine whether the in-service rate 410 exceeds the outbound rate 420 and is less than or equal to the inbound rate 430 in the first maintenance window 401 of the time zone Z1. When the in-service rate 410 exceeds the outbound rate 420 and is less than or equal to the inbound rate 430 in the first maintenance window 401 of the time zone Z1, the controller node 110 may continue an operation for resetting the network elements corresponding to a time in which the in-service rate 410 exceeds the outbound rate 420 and less than or equal to the inbound rate 430.

Figure 5:
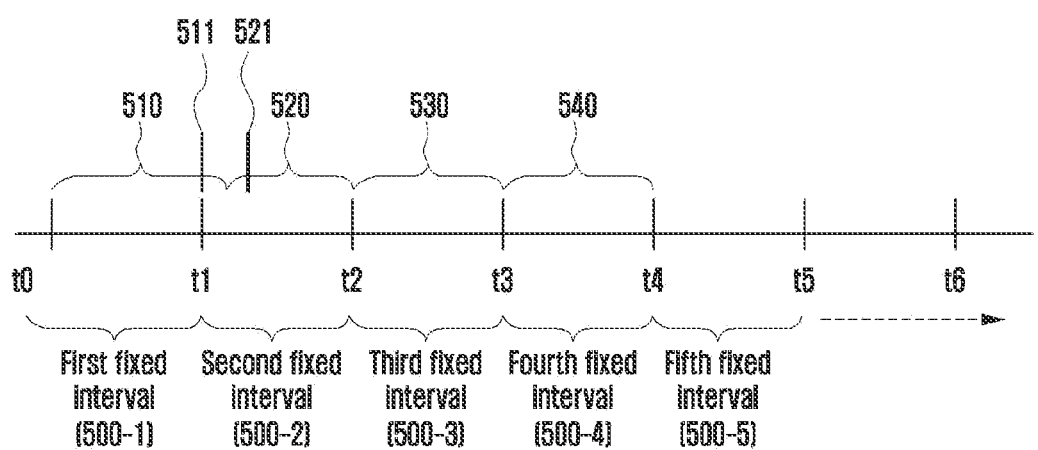
FIG. 5 is a conceptual diagram illustrating an operation for resetting network elements based on a self-executing capacity threshold ratio of a server in a communication system according to an embodiment of the disclosure.

FIG. 5 is a conceptual diagram illustrating an operation for resetting network elements based on a self-executing capacity threshold ratio of a server in a communication system according to an embodiment of the disclosure.

With reference to FIG. 5, the controller node 110 may determine a plurality of fixed intervals 500-1 to 500-5 for processing reset of a plurality of network elements positioned in a specific time zone. For example, each of the plurality of fixed intervals 500-1 to 500-5 may be the same time period.

For example, the controller node 110 may have to complete a process for resetting the N number of network elements in the first fixed interval 500-1. The controller node 110 may complete a process for resetting the N number of network elements before a specific time 521 exceeding an end time 511 of the first fixed interval 500-1.

The controller node 110 may perform an operation for completing reset of the N number of network elements within a predetermined fixed interval. For example, the controller node 110 may determine whether to complete a process for resetting the N number of network elements based on a self-executing capacity threshold ratio E. For example, the controller node 110 may determine whether to complete a process for resetting the N number of network elements based on the reset interval information. The controller node 110 may generate reset interval information based on the time zone information. For example, the reset interval information may be the same as that illustrated in Table 2.

capacity ratio E. Accordingly, the controller node 110 may prevent a network burst that causes a delay in service recovery for network elements.

The controller node 110 may generate a network element list based on the in-service rate S and the self-executing capacity threshold rate E. For example, the controller node 110 may determine network elements to perform reset based on the in-service rate and the self-executing capacity threshold rate. The network element list may include information indicating network elements to be reset.

Referring back to FIG. 3, the controller node 110 may transmit the network element list to the serving node 120

TABLE 2

| Algorithm execution time | Number of all NEs | Number of completed NEs within interval | Number of completed NEs | Number of uncompleted NEs | Number of previously uncompleted NEs | Operational efficiency gain | PnP reset rate | Balancing NE count | Self-execution capacity reduction rate | Fixed interval | Elapsed time | Remaining time | Number of delayed NEs |
|---|---|---|---|---|---|---|---|---|---|---|---|---|---|
| 10:01 | 10000 | 600 | 600 | 9400 | 0 | 600 | 714 | 1000 | 10.00% | 15 | 1 | 14 | 0 |
| 10:02 | 9400 | 630 | 1230 | 8770 | 0 | 615 | 723 | 775 | 7.75% | 15 | 2 | 13 | 0 |
| 10:03 | 8770 | 620 | 1850 | 8150 | 0 | 617 | 731 | 750 | 7.50% | 15 | 3 | 12 | 0 |
| 10:04 | 8150 | 644 | 2494 | 7506 | 0 | 624 | 741 | 648 | 6.48% | 15 | 4 | 11 | 0 |
| 10:05 | 7506 | 633 | 3127 | 6873 | 0 | 625 | 751 | 619 | 6.19% | 15 | 5 | 10 | 0 |
| 10:06 | 6873 | 643 | 3770 | 6230 | 0 | 628 | 764 | 575 | 5.75% | 15 | 6 | 9 | 0 |
| 10:07 | 6230 | 633 | 4403 | 5597 | 0 | 629 | 779 | 565 | 5.65% | 15 | 7 | 8 | 0 |
| 10:08 | 5597 | 620 | 5023 | 4977 | 0 | 628 | 800 | 582 | 5.82% | 15 | 8 | 7 | 0 |
| 10:09 | 4977 | 618 | 5641 | 4359 | 0 | 627 | 830 | 598 | 5.98% | 15 | 9 | 6 | 0 |
| 10:10 | 4359 | 625 | 6266 | 3734 | 0 | 627 | 872 | 601 | 6.01% | 15 | 10 | 5 | 0 |
| 10:11 | 3734 | 630 | 6896 | 3104 | 0 | 627 | 934 | 596 | 5.96% | 15 | 11 | 4 | 0 |
| 10:12 | 3104 | 640 | 7536 | 2464 | 0 | 628 | 1035 | 580 | 5.80% | 15 | 12 | 3 | 0 |
| 10:13 | 2464 | 635 | 8171 | 1829 | 0 | 629 | 1232 | 572 | 5.72% | 15 | 13 | 2 | 0 |
| 10:14 | 1829 | 640 | 8811 | 1189 | 0 | 629 | 1829 | 560 | 5.60% | 15 | 14 | 1 | 0 |
| 10:15 | 1189 | 633 | 9444 | 556 | 0 | 630 |  | 556 | 5.56% | 15 | 15 | 0 | 0 |
| 10:16 | 10556 | 635 | 655 | 9921 | 556 | 655 | 754 | 751 | 7.11% | 15 | 1 | 14 | 0 |
| 10:17 | 9921 | 599 | 1254 | 9322 |  | 627 | 763 | 1171 | 11.09% | 15 | 2 | 13 | 0 |
| 10:18 | 9322 | 591 | 1845 | 8731 |  | 615 | 777 | 1351 | 12.80% | 15 | 3 | 12 | 0 |
| 10:19 | 8731 | 588 | 2433 | 8143 |  | 608 | 794 | 1452 | 13.76% | 15 | 4 | 11 | 0 |
| 10:20 | 8143 | 591 | 3024 | 7552 |  | 605 | 814 | 1504 | 14.25% | 15 | 5 | 10 | 0 |
| 10:21 | 7552 | 599 | 3623 | 6953 |  | 604 | 839 | 1519 | 14.39% | 15 | 6 | 9 | 0 |
| 10:22 | 6953 | 593 | 4216 | 6360 |  | 602 | 869 | 1542 | 14.61% | 15 | 7 | 8 | 0 |
| 10:23 | 6360 | 588 | 4804 | 5772 |  | 601 | 909 | 1569 | 14.86% | 15 | 8 | 7 | 0 |
| 10:24 | 5772 | 594 | 5398 | 5178 |  | 600 | 962 | 1579 | 14.96% | 15 | 9 | 6 | 0 |
| 10:25 | 5178 | 588 | 5986 | 4590 |  | 599 | 1036 | 1597 | 15.13% | 15 | 10 | 5 | 1597 |
| 10:26 | 2993 | 600 | 6586 | 2593 |  | 599 | 748 | −2 | −0.02% | 15 | 11 | 4 | 0 |
| 10:27 | 2393 | 630 | 7216 | 1763 |  | 601 | 798 | 241 | −0.39% | 15 | 12 | 3 | 0 |
| 10:28 | 1763 | 640 | 7856 | 1123 |  | 604 | 882 | −86 | −0.81% | 15 | 13 | 2 | 0 |
| 10:29 | 1123 | 635 | 8491 | 488 |  | 607 | 1123 | −119 | −1.12% | 15 | 14 | 1 | 0 |
| 10:30 | 488 | 640 | 9131 | −152 |  | 609 |  | −152 | −1.44% | 15 | 15 | 0 | 0 |

For example, with reference to Table 2, each of the plurality of fixed intervals 500-1 to 500-5 may be 15 seconds (sec). The self-executing capacity threshold ratio E of the server 100 may be 15%. The controller node 110 may determine a self-executing capacity reduction rate for every 1 second corresponding to an algorithm execution time based on the reset interval information. The controller node 110 may determine an algorithm execution time at which the self-executing capacity reduction rate exceeds the self-executing capacity threshold ratio E. For example, at an algorithm execution time 10:25, the self-executing capacity reduction rate may be 15.13%. The controller node 110 may determine the algorithm execution time 10:25 exceeding the self-executing capacity threshold ratio E. The controller node 110 may determine not to perform an operation for resetting 1597 network elements corresponding to the algorithm execution time 10:25.

That is, the controller node 110 may control over-traffic from the network elements based on the self-executing (S305). The serving node 120 may receive the network element list from the controller node 110.

The serving node 120 may transmit a network element reset request message to the network element 200 based on the network element list (S306). The network element 200 may receive a network element reset request message from the serving node 120.

The network element 200 may transmit a configuration information request message to the controller node 110 based on the network element reset request message received from the serving node 120 (S307). The controller node 110 may receive a configuration information request message from the network element 200.

The controller node 110 may transmit a configuration information response message to the network element 200 based on the configuration information request message received from the network element 200 (S308). The network element 200 may receive a configuration information response message from the controller node 110.

The network element 200 may share current configuration information on the network element 200 with the serving node 120 based on the configuration information response message received from the controller node 110 (S309). For example, the network element 200 may transmit, to the serving node 120, a message notifying that the configuration information of the network element 200 is changed. The serving node 120 may receive, from the network element 200, a message notifying that the configuration information of the network element 200 is changed.

The serving node 120 may transmit, to the database node 130, a message notifying that the configuration information of the network element 200 received from the network element 200 is changed (S310). The database node 130 may receive, from the serving node 120, a message notifying that the configuration information of the network element 200 is changed. The database node 130 may update the configuration information based on a message notifying that the configuration information of the network element 200 is changed.

The serving node 120 may transmit a message instructing to apply the changed configuration information to the network element 200 (S311). The network element 200 may receive a message instructing to apply the changed configuration information from the serving node 120. The network element 200 may apply the changed configuration information based on a message instructing to apply the changed configuration information.

Figure 6:
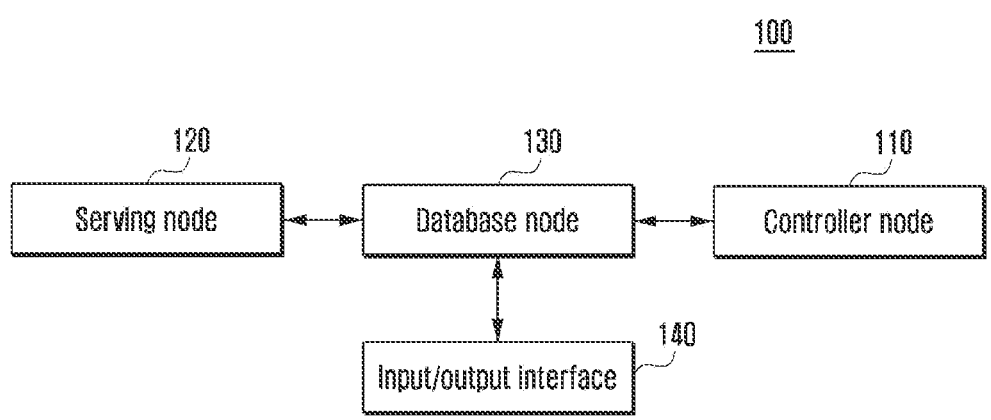
FIG. 6 is a block diagram illustrating a server in a communication system according to an embodiment of the disclosure.

FIG. 6 is a block diagram illustrating a server in a communication system according to an embodiment of the disclosure.

With reference to FIG. 6, the server 100 may include a controller node 110, a serving node 120, a database node 130, and an input/output interface 140. The input/output interface 140 may receive an input of various types of information from an operator of the server 100. For example, the input/output interface 140 may receive an input of various types of configuration information from the operator.

The controller node 110 will be described in more detail with reference to FIG. 7 below. The serving node 120 will be described in more detail with reference to FIG. 8 below. The database node 130 will be described in more detail with reference to FIG. 9 below.

Figure 7:
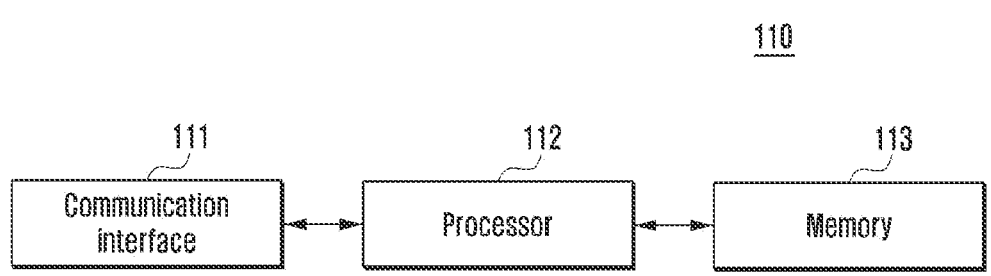
FIG. 7 is a block diagram illustrating a controller node in a communication system according to an embodiment of the disclosure.

FIG. 7 is a block diagram illustrating a controller node in a communication system according to an embodiment of the disclosure.

With reference to FIG. 7, the controller node 110 may include a communication interface 111, a processor 112, and a memory 113. The communication interface 111 may communicate with a network entity of a communication system by wire or wirelessly. For example, the communication interface 111 may communicate with the serving node 120, the database node 130, and the network element 200.

The memory 113 may store various instructions. The processor 112 may execute instructions stored in the memory 113.

The communication interface 111 may receive time zone information and threshold information from the database node 130.

The processor 112 may generate a network element (NE) list based on time zone information and threshold information.

The time zone information may include a list of a plurality of different time zones, a maintenance period corresponding to each of the time zones, and information on NEs disposed in each of the time zones.

The information on the NEs may include the number of NEs in which reset is required among NEs disposed in each of the time zones.

The processor 112 may determine a reset rate corresponding to each of the time zones based on the maintenance period and the number of NEs in which reset is required.

The processor 112 may determine a reset completion rate of each of the time zones based on information on the NEs and the maintenance period.

The reset completion rate may indicate a ratio of network elements capable of completing reset within a maintenance period among serviceable network elements disposed in each of the time zones.

The processor 112 may determine an in-service rate based on the reset rate and the reset completion rate.

The processor 112 may generate a network element list based on the in-service rate and the threshold information.

The network element list may indicate at least one network element that receives the reset request message.

The in-service rate may be generated in units of the maintenance period.

The processor 112 may generate reset interval information based on the time zone information. The reset interval information may include information on a predetermined reset interval and a self-execution capacity reduction rate of the controller node. The self-executing capacity reduction rate may be generated in each reset interval.

The processor 112 may generate a network element list based on the in-service rate, the threshold information, and the self-executing capacity reduction rate.

The communication interface 111 may transmit the network element list to the serving node 120.

The communication interface 111 may receive a configuration information request message from a network element corresponding to the network element list. The communication interface 111 may transmit a configuration information response message to the network element corresponding to the configuration information request message.

Figure 8:
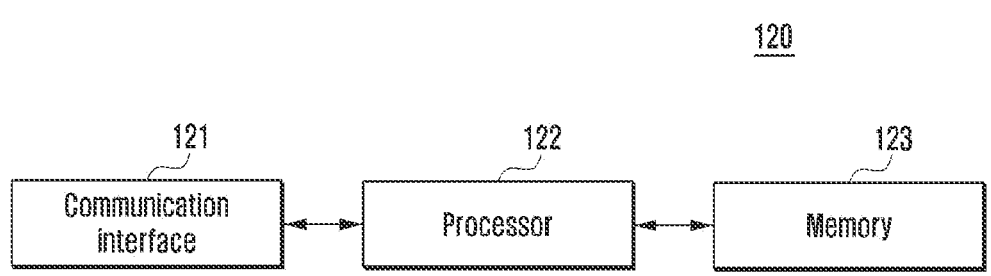
FIG. 8 is a block diagram illustrating a serving node in a communication system according to an embodiment of the disclosure.

FIG. 8 is a block diagram illustrating a serving node in a communication system according to an embodiment of the disclosure.

With reference to FIG. 8, the serving node 120 may include a communication interface 121, a processor 122, and a memory 123. The communication interface 121 may communicate with a network entity of a communication system by wire or wirelessly, For example, the communication interface 121 may communicate with the controller node 110, the database node 130, and the network element 200.

The memory 123 may store various instructions. The processor 122 may execute instructions stored in the memory 123.

The communication interface 121 may receive a configuration information update request message from the network element 200.

The communication interface 121 may receive a network element list from the controller node 110.

The processor 122 may generate a network element reset request message based on the network element list.

The communication interface 121 may transmit a network element reset request message to the network element 200 corresponding to the network element list.

The communication interface 121 may receive, from the network element 200, a message notifying that the configuration information of the network element 200 is changed. The communication interface 121 may transmit, to the database node 130, a message notifying that the configuration information of the network element 200 is changed. The processor 122 may generate a message instructing to apply the changed configuration information corresponding to a message notifying that configuration information of the network element 200 is changed. The communication interface 121 may transmit a message instructing to apply the changed configuration information to the network element 200.

Figure 9:
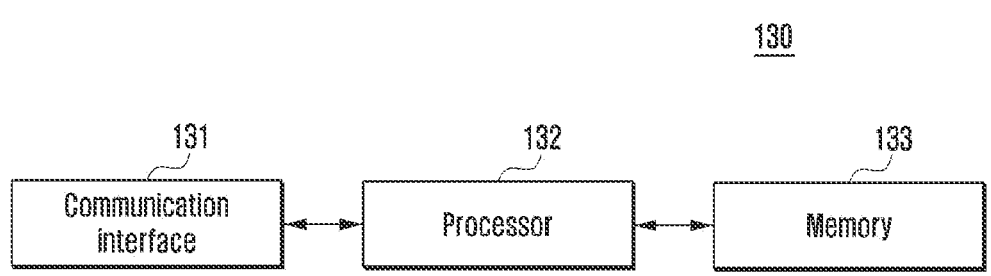
FIG. 9 is a block diagram illustrating a database node in a communication system according to an embodiment of the disclosure.

FIG. 9 is a block diagram illustrating a database node in a communication system according to an embodiment of the disclosure.

With reference to FIG. 9, the database node 130 may include a communication interface 131, a processor 132, and a memory 133. The communication interface 131 may communicate with a network entity of a. communication system by wire or wirelessly. For example, the communication interface 131 may communicate with the controller node 110, the serving node 120, and the network element 200.

The memory 133 may store various instructions. The processor 132 may execute instructions stored in the memory 113.

The processor 132 may update the configuration information. The processor 132 may generate time time zone information and threshold information. For example, the configuration information may include time zone information and threshold information, The time zone information may include a list of a plurality of different time zones, a maintenance period corresponding to each of the time zones, and information on NEs disposed in each of the time zones. The information on the NEs may include the number of NEs in which reset is required among NEs disposed in each of the time zones.

The communication interface 131 may transmit time zone information and threshold information to the controller node 110.

The communication interface 131 may receive, from the serving node 120, a message notifying that the configuration information of the network element 200 is changed. The processor 122 may update the configuration information based on a message notifying that the configuration information of the network element 200 is changed.

Figure 10:
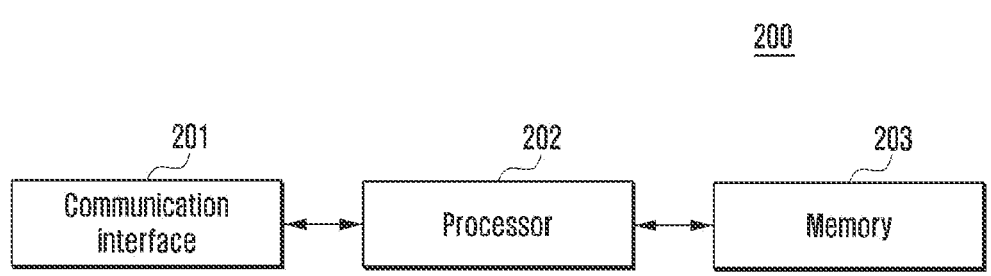
FIG. 10 is a block diagram illustrating a network element in a communication system according to an embodiment of the disclosure.

FIG. 10 is a block diagram illustrating a network element in a communication system according to an embodiment of the disclosure.

With reference to FIG. 10, the network element 200 may include a communication interface 201, a processor 202, and a memory 203. The communication interface 201 may communicate with a network entity of a communication system by wire or wirelessly. For example, the communication interface 201 may communicate with the controller node 110, the serving node 120, and the database node 130.

The memory 203 may store various instructions. The processor 202 may execute instructions stored in the memory 203.

The processor 202 may generate a configuration information update request message of the network element 200. The communication interface 201 may transmit a configuration information update request message to the serving node 120.

The communication interface 201 may transmit a network element reset request message from the serving node 120. The network element reset request message may be transmitted corresponding to the network element list generated by the controller node 110.

The processor 202 may generate a configuration information request message based on the network element reset request message. The communication interface 201 may transmit a configuration information request message to the controller node 110. The communication interface 201 may receive a configuration information response message from the controller node 110 corresponding to the configuration information request message.

The processor 202 may generate a message notifying that the configuration information of the network element 200 is changed based on the configuration information response message. The communication interface 201 may transmit, to the serving node 120, a message notifying that the configuration information of the network element 200 is changed. The communication interface 201 may receive, from the serving node 120, a message instructing to apply the changed configuration information corresponding to a message notifying that the configuration information of the network element 200 is changed. The processor 202 may apply the changed configuration information based on a message instructing to apply the changed configuration information.

The disclosure may be used in the electronic industry and the information and communication industry.

The invention claimed is:

1. A controller node, comprising:
a processor configured to generate a network element (NE) list based on time zone information and threshold information obtained from a database (DB) node; and
a communication interface configured to receive a configuration information request message from a network element corresponding to the network element list and to transmit a configuration information response message to the network element corresponding to the configuration information request message,
wherein the time zone information comprises a list of a plurality of different time zones, a maintenance period corresponding to each of the time zones, and information on NEs disposed in each of the time zones,
wherein the information on the NEs comprises the number of NEs in which reset is required among NEs disposed in each of the time zones,
wherein the processor is configured to determine a reset rate corresponding to each of the time zones based on the maintenance period and the number of NEs in which reset is required, a reset rate corresponding to each of the time zones based on the maintenance period and the number of NEs in which reset is required, and a reset completion rate of each of the time zones based on the information on the NEs and the maintenance period,
wherein the reset completion rate indicates a ratio of network elements capable of completing reset within the maintenance period among serviceable network elements disposed in each of the time zones,
wherein the processor is configured to determine an in-service rate based on the reset rate and the reset completion rate.

2. The controller node of claim 1, wherein the processor is configured to generate the network element list based on the in-service rate and the threshold information, and
the network element list indicates at least one network element that receives the reset request message.

3. The controller node of claim 1, wherein the in-service rate is generated in units of the maintenance period.

4. The controller node of claim 1, wherein the processor is configured to generate reset interval information based on the time zone information, the reset interval information comprises information on a predetermined reset interval and a self-execution capacity reduction rate of the controller node, and the self-executing capacity reduction rate is generated in each reset interval.

5. The controller node of claim 4, wherein the processor is configured to generate the network element list based on the in-service rate, the threshold information, and the self-executing capacity reduction rate.

6. A method of operating a controller node, the method comprising:

generating a network element (NE) list based on time zone information and threshold information obtained from a database (DB) node;

receiving a configuration information request message from a network element corresponding to the network element list; and transmitting a configuration information response message to the network element corresponding to the configuration information request message, wherein the time zone information comprises a list of a plurality of different time zones, a maintenance period corresponding to each of the time zones, and information on NEs disposed in each of the time zones, wherein the information on the NEs comprises the number of NEs in which reset is required among NEs disposed in each of the time zones, wherein generating a network element (NE) list comprises determining a reset rate corresponding to each of the time zones based on the maintenance period and the number of NEs in which reset is required, wherein generating a network element (NE) list further comprises determining a reset completion rate of each of the time zones based on information on the NEs and the maintenance period, wherein the reset completion rate indicates a ratio of network elements capable of completing reset within the maintenance period among serviceable network elements disposed in each of the time zones, wherein generating a network element (NE) list further comprising determining an in-service rate based on the reset rate and the reset completion rate.

7. The method of claim 6, wherein generating a network element (NE) list further comprising generating the network element list based on the in-service rate and the threshold information, and the network element list indicates at least one network element that receives the reset request message.

8. The method of claim 6, wherein the in-service rate is generated in units of the maintenance period.

9. The method of claim 6, wherein generating a network element (NE) list further comprising generating reset interval information based on the time zone information, the reset interval information comprises information on a predetermined reset interval and a self-execution capacity reduction rate of the controller node, and the self-executing capacity reduction rate is generated in each reset interval.

10. The method of claim 9, wherein generating a network element (NE) list further comprising generating the network element list based on the in-service rate, the threshold information, and the self-executing capacity reduction rate.

* * * * *